(12) United States Patent
Li et al.

(10) Patent No.: US 10,678,101 B2
(45) Date of Patent: Jun. 9, 2020

(54) LIQUID CRYSTAL GRATING, CONTROL METHOD THEREOF AND DISPLAY DEVICE

(71) Applicants: BOE Technology Group Co., Ltd., Beijing (CN); Beijing BOE Optoelectronics Technology Co., Ltd., Beijing (CN)

(72) Inventors: Yanchen Li, Beijing (CN); Yue Li, Beijing (CN); Jian Wang, Beijing (CN); Yu Zhao, Beijing (CN); Wenjun Xiao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/016,878

(22) Filed: Jun. 25, 2018

(65) Prior Publication Data

US 2019/0204640 A1 Jul. 4, 2019

(30) Foreign Application Priority Data

Jan. 2, 2018 (CN) .......................... 2018 1 0002320

(51) Int. Cl.
*G02F 1/1343* (2006.01)
*G02F 1/1362* (2006.01)
(Continued)

(52) U.S. Cl.
CPC ........ *G02F 1/1343* (2013.01); *G02F 1/13306* (2013.01); *G02F 1/136286* (2013.01);
(Continued)

(58) Field of Classification Search
CPC ............... G02F 1/1343; G02F 1/13439; G02F 1/14309; G02F 1/292; G09G 3/003; G09G 3/36–3696
See application file for complete search history.

(56) References Cited

U.S. PATENT DOCUMENTS

| | | | |
|---|---|---|---|
| 9,239,509 B2 | 1/2016 | Kanbayashi | |
| 2011/0115779 A1* | 5/2011 | Fujikawa | G09G 3/3614 345/212 |
| 2014/0293208 A1* | 10/2014 | Kanbayashi | G02F 1/133502 349/138 |

FOREIGN PATENT DOCUMENTS

| | | |
|---|---|---|
| CN | 102364391 A | 2/2012 |
| CN | 203673189 U | 6/2014 |

(Continued)

OTHER PUBLICATIONS

First Office Action, including Search Report, for Chinese Patent Application No. 201810002320.9, dated Dec. 4, 2019, 17 pages.

*Primary Examiner* — Gene W Lee
(74) *Attorney, Agent, or Firm* — Westman, Champlin & Koehler, P.A.

(57) ABSTRACT

Provided is a liquid crystal grating including: a first substrate; a second substrate opposite to the first substrate; a liquid crystal layer between the first substrate and the second substrate; a first electrode structure on the first substrate; and a second electrode structure on the second substrate. The first electrode structure and the second electrode structure are configured to receive control signals, the control signal including a first set of control signals and a second set of control signals; to cause the liquid crystal grating to have a first grating pitch in response to the first set of control signals; and to cause the liquid crystal grating to have a
(Continued)

second grating pitch in response to the second set of control signals, the second grating pitch being different from the first grating pitch.

18 Claims, 7 Drawing Sheets

(51) Int. Cl.
  *G02F 1/133* (2006.01)
  *G09G 3/00* (2006.01)
  G09G 3/36 (2006.01)
(52) U.S. Cl.
  CPC ............. *G09G 3/006* (2013.01); *G09G 3/003* (2013.01); *G09G 3/36* (2013.01)

(56) References Cited

FOREIGN PATENT DOCUMENTS

| | | |
|---|---|---|
| CN | 104035261 A | 9/2014 |
| CN | 204101856 U | 1/2015 |
| CN | 107272273 A | 10/2017 |
| WO | 2013/054507 A1 | 4/2013 |

* cited by examiner

LIQUID CRYSTAL GRATING, CONTROL METHOD THEREOF AND DISPLAY DEVICE

CROSS-REFERENCE TO RELATED APPLICATION

This application claims the benefit of Chinese Patent Application No. 201810002320.9 filed on Jan. 2, 2018 in the State Intellectual Property Office of China, the whole disclosure of which is incorporated herein by reference.

TECHNICAL FIELD

The present disclosure relates to the field of display technology, and in particular, to a liquid crystal grating, a control method thereof, and a display device.

BACKGROUND

In order to provide a better user experience, more and more display products begin to integrate functions such as 3D display and dual view display. Currently, a liquid crystal grating is generally used to switch between 2D display and 3D display or between dual view display and non-dual-view display. However, the liquid crystal grating usually only has a single fixed grating pitch which cannot be switched or changed, so that a switch between the 3D display and the dual view display, a switch between two different 3D display effects and a switch between two different dual view display effects cannot be obtained.

SUMMARY

In an aspect, it is provided a liquid crystal grating including: a first substrate; a second substrate opposite to the first substrate; a liquid crystal layer between the first substrate and the second substrate; a first electrode structure on the first substrate; and a second electrode structure on the second substrate. The first electrode structure and the second electrode structure are configured: to receive control signals, the control signal including a first set of control signals and a second set of control signals; to cause the liquid crystal grating to have a first grating pitch in response to the first set of control signals; and to cause the liquid crystal grating to have a second grating pitch in response to the second set of control signals, the second grating pitch being different from the first grating pitch.

Optionally, the first electrode structure includes: a plurality of first strip electrodes spaced apart in a first direction on the first substrate; a plurality of second strip electrodes spaced apart in the first direction on the first substrate; and a first insulating layer between the plurality of first strip electrodes and the plurality of second strip electrodes. The plurality of first strip electrodes are located in a first plane, the plurality of second strip electrodes are located in a second plane different from the first plane, and orthogonal projections of the plurality of first strip electrodes on the first substrate are not overlapped with orthogonal projections of the plurality of second strip electrodes on the first substrate.

Optionally, a width of each of the plurality of first strip electrodes in the first direction is a first electrode width, a width of a gap between two adjacent first strip electrodes in the first direction is a first width, and the first grating pitch is equal to the sum of the first electrode width and the first width.

Optionally, an orthogonal projection of each of the plurality of second strip electrodes on the first substrate coincides with an orthogonal projection of a gap between two adjacent first strip electrodes on the first substrate, and a width of the gap between the two adjacent first strip electrodes in the first direction is a first width, a width of a gap between two adjacent second strip electrodes in the first direction is a second width, and the first grating pitch is equal to the sum of the first width and the second width.

Optionally, the first width is equal to the second width.

Optionally, the first electrode structure further includes: first electrode input lines electrically connected to the plurality of first strip electrodes, the first electrode input lines being located in the first plane; and second electrode input lines electrically connected to the plurality of second strip electrodes, the second electrode input line being located in the second plane. The first electrode input lines and the second electrode input lines are configured to receive the control signals.

Optionally, the second electrode structure includes: a plurality of third strip electrodes spaced apart in a first direction on the second substrate; a plurality of fourth strip electrodes spaced apart in the first direction on the second substrate; and a second insulating layer between the plurality of third strip electrodes and the plurality of fourth strip electrodes. The plurality of third strip electrodes are located in a third plane, the plurality of fourth strip electrodes are located in a fourth plane different from the third plane, and orthogonal projections of the plurality of third strip electrodes on the second substrate are not overlapped with orthogonal projections of the plurality of fourth strip electrodes on the second substrate.

Optionally, a width of each of the plurality of third strip electrodes in the first direction is a third electrode width, a width of a gap between two adjacent third strip electrodes in the first direction is a third width, and the second grating pitch is equal to the sum of the third electrode width and the third width.

Optionally, an orthogonal projection of each of the plurality of fourth strip electrodes on the second substrate coincides with an orthogonal projection of a gap between two adjacent third strip electrodes on the second substrate, and wherein a width of the gap between the two adjacent third strip electrodes in the first direction is a third width, a width of a gap between two adjacent fourth strip electrodes in the first direction is a fourth width, and the second grating pitch is equal to the sum of the third width and the fourth width.

Optionally, the third width is equal to the fourth width.

Optionally, the second electrode structure further includes: third electrode input lines electrically connected to the plurality of third strip electrodes, the third electrode input lines being located in the third plane; and fourth electrode input lines electrically connected to the plurality of fourth strip electrodes, the fourth electrode input line being located in the fourth plane. The third electrode input lines and the fourth electrode input lines are configured to receive the control signals.

In another aspect, it is provided a control method of a liquid crystal grating, wherein the liquid crystal grating includes: a first substrate; a second substrate opposite to the first substrate; a liquid crystal layer between the first substrate and the second substrate; a first electrode structure on the first substrate; and a second electrode structure on the second substrate, and the method includes:

receiving a first set of control signals by the first electrode structure and the second electrode structure to control the liquid crystal grating to have a first grating pitch; and receiving a second set of control signals by the first electrode structure and the second electrode structure to control the liquid crystal grating to have a second grating pitch different from the first grating pitch.

Optionally, the first electrode structure includes a plurality of first strip electrodes spaced apart in a first direction on the first substrate and a plurality of second strip electrodes spaced apart in the first direction on the first substrate, and the second electrode structure includes a plurality of third strip electrodes spaced apart in the first direction on the second substrate and a plurality of fourth strip electrodes spaced apart in the first direction on the second substrate. The receiving a first set of control signals by the first electrode structure and the second electrode structure to control the liquid crystal grating to have a first grating pitch includes:

receiving a first timing control signal by the plurality of first strip electrodes, and receiving a second timing control by the plurality of second strip electrodes, the plurality of third strip electrodes and the plurality of fourth strip electrodes, to control the liquid crystal grating to have the first grating pitch.

Optionally, the receiving a second set of control signals by the first electrode structure and the second electrode structure to control the liquid crystal grating to have a second grating pitch different from the first grating pitch includes:

receiving the first timing control signal by the plurality of third strip electrodes, and receiving the second timing control by the plurality of first strip electrodes, the plurality of second strip electrodes and the plurality of fourth strip electrodes, to control the liquid crystal grating to have the second grating pitch.

Optionally, the first timing control signal is a square wave signal.

Optionally, the second timing control signal is a constant voltage DC signal.

Optionally, the receiving a first timing control signal by the plurality of first strip electrodes, and receiving a second timing control by the plurality of second strip electrodes, the plurality of third strip electrodes and the plurality of fourth strip electrodes, to control the liquid crystal grating to have the first grating pitch includes:

receiving the first timing control signal by the plurality of first strip electrodes, and receiving the second timing control by the plurality of second strip electrodes, the plurality of third strip electrodes and the plurality of fourth strip electrodes, to control regions where the plurality of first strip electrodes are located to appear dark and control regions where the plurality of second strip electrodes are located to appear bright, so as to form a first liquid crystal grating having the first grating pitch.

Optionally, the receiving a first timing control signal by the plurality of third strip electrodes, and receiving a second timing control by the plurality of first strip electrodes, the plurality of second strip electrodes and the plurality of fourth strip electrodes, to control the liquid crystal grating to have the second grating pitch includes:

receiving the first timing control signal by the plurality of third strip electrodes, and receiving the second timing control by the plurality of first strip electrodes, the plurality of second strip electrodes and the plurality of fourth strip electrodes, to control regions where the plurality of third strip electrodes are located to appear dark and control regions where the plurality of fourth strip electrodes are located to appear bright, so as to form a second liquid crystal grating having the second grating pitch.

In a further aspect, it is provided a display device, wherein the display device includes the liquid crystal grating as described above.

Optionally, the display device is a 3D display device and/or a dual view display device.

BRIEF DESCRIPTION OF THE DRAWINGS

Other features, objects, and advantages of the present disclosure will become more apparent by reading the detailed descriptions of non-limiting embodiments with reference to the following drawings.

DETAILED DESCRIPTION OF THE EMBODIMENTS

Figure 1:
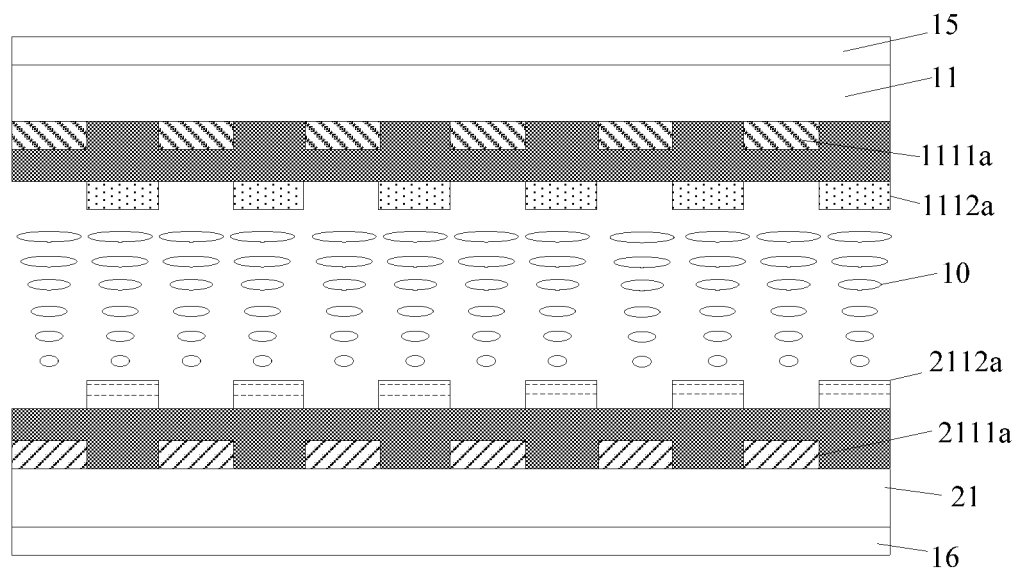
FIG. 1 shows a schematic structural view of a liquid crystal grating according to an embodiment of the present disclosure.

The present disclosure will be further described in detail below with reference to the accompanying drawings and embodiments. It will be understood that the specific embodiments described herein are merely used to explain the related invention and not to limit the invention. In addition, it should be noted that, for ease of description, only parts related to the invention are shown in the drawings.

It should be noted that the embodiments in the present disclosure and the features in the embodiments may be combined with each other without conflict. The present disclosure will be described in detail below with reference to the drawings and in combination with the embodiments.

Unless defined otherwise, technical terms or scientific terms used in the present disclosure should be commonly understood by persons having ordinary skill in the field to which the present disclosure belongs. The use of "first", "second", and the like in the present disclosure does not denote any order, quantity, or importance, but rather merely serves to distinguish between different components. The word "include" or "comprise" or the like means that the presence of an element or item preceding the word encompasses any element or item listed after the word or its equivalence, and does not exclude other elements or items. The word "connect" or "connected" or the like is not limited to physical or mechanical connections, but may include electrical connection or signal connection, whether directly or indirectly.

Unless stated otherwise, the expression herein "dual view" or "dual view display" refers to displaying two images without interference in a display device according to different viewing angles, that is, the user may observe different images on one display device from different viewing angles. For example, the dual view display may be applied to an on-vehicle display. By means of the dual view display, passengers sitting on different seats in the vehicle may see different images on the same one display.

In the related art, a liquid crystal grating includes an upper substrate, a lower substrate and a liquid crystal layer between the upper substrate and the lower substrate. The upper substrate includes a transparent conductive planar layer, and the lower substrate includes a strip electrode structure. Therefore, the liquid crystal grating may only form a grating with a single structure, that is, the liquid crystal grating may only be set to have a single fixed grating pitch, so that only one three-dimensional (abbreviated as 3D) display effect or only one dual view display effect can be obtained.

In view of the above description, a liquid crystal grating and a control method thereof provided by embodiments of the present disclosure may obtain a switch between two different grating pitches in the same one liquid crystal grating, so that it is switchable between two 3D display effects, between two dual view display effects, between 3D display effect and dual view display effect, between 3D display effects at two resolutions or between dual view display effects at two resolutions, by means of the same one liquid crystal grating.

Figure 2:
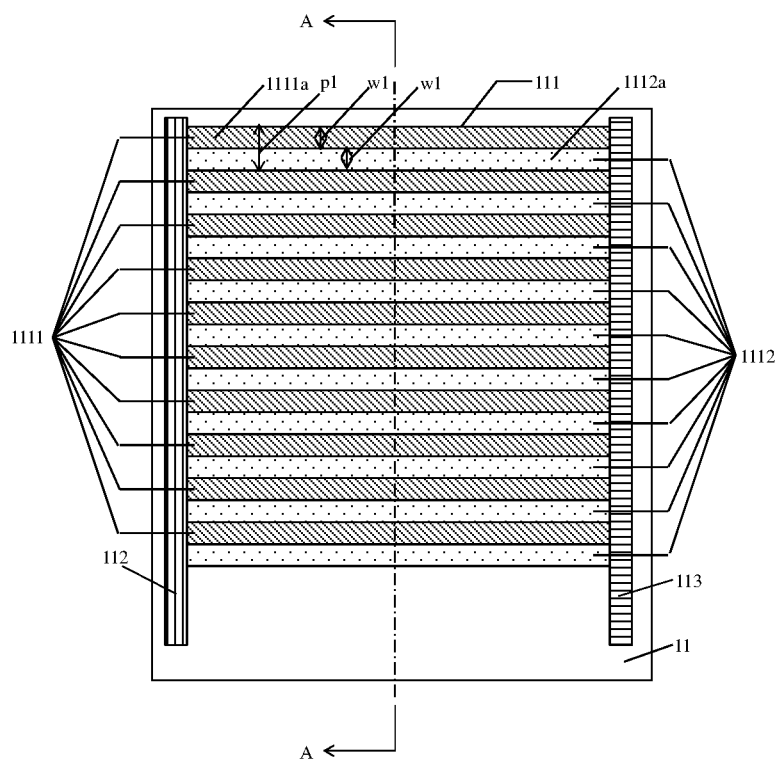
FIG. 2 shows a schematic plan view of a first substrate of a liquid crystal grating according to an embodiment of the present disclosure.
Figure 3:
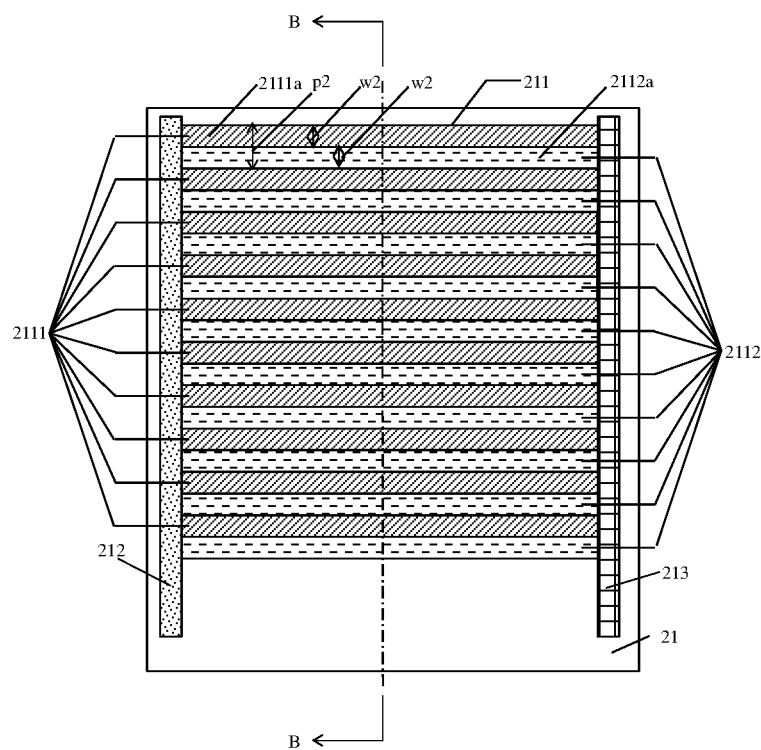
FIG. 3 shows a schematic plan view of a second substrate of a liquid crystal grating according to an embodiment of the present disclosure.

FIG. 1 shows a schematic structural view of a liquid crystal grating according to an embodiment of the present disclosure, and FIGS. 2 and 3 respectively show a structural plan view of a first substrate 11 and a structural plan view of a second substrate 12 of the liquid crystal grating according to the embodiment of the present disclosure.

As shown in FIG. 1, FIG. 2 and FIG. 3, the liquid crystal grating includes a first substrate 11, a second substrate 21 opposite to the first substrate 11, and a liquid crystal layer 10 between the first substrate 11 and the second substrate 21.

In the illustrated embodiment, the liquid crystal grating may further include: a polarizer 15 disposed on the first substrate 11; and a polarizer 16 disposed on the second substrate 21. For example, a direction of a transmission axis of the polarizer 15 is perpendicular to a direction of a transmission axis of the polarizer 16.

According to an embodiment of the present disclosure, the liquid crystal grating further includes: a first electrode structure 111 disposed on the first substrate 11; and a second electrode structure 211 disposed on the second substrate 21.

The first electrode structure 111 and the second electrode structure 211 may be configured to receive control signals including a first set of control signals and a second set of control signals; to cause the liquid crystal grating to have a first grating pitch p1 in response to the first set of received control signals; and to cause the liquid crystal grating to have a second grating pitch p2 that is different from the first grating pitch p1, in response to the second set of received control signals.

Figure 4:
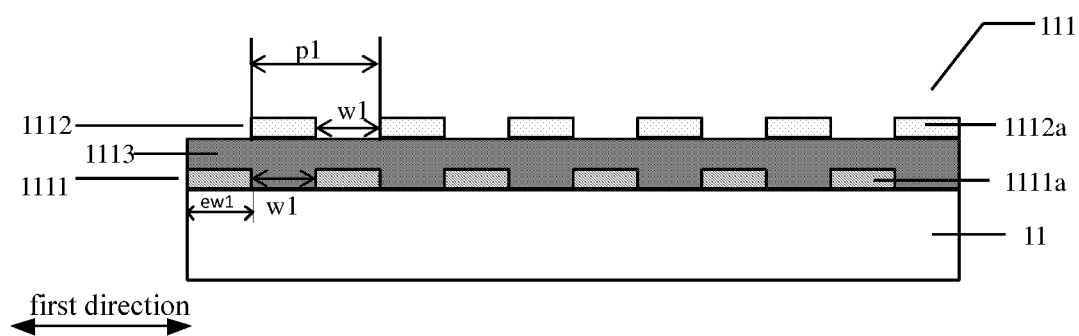
FIG. 4 shows a cross-sectional view of a first electrode structure taken along line A-A in FIG. 2 according to an embodiment of the present disclosure.

FIG. 4 shows a cross-sectional view of the first electrode structure 111 taken along line A-A in FIG. 2 according to an embodiment of the present disclosure. As shown in FIG. 4, the first electrode structure 111 may further include a plurality of first strip electrodes 1111a spaced apart in a first direction (refer to the left-right direction in FIG. 4) on the first substrate 11; a plurality of second strip electrodes 1112a spaced apart in the first direction on the first substrate 11; and a first insulating layer 1113 between the plurality of first strip electrodes 1111a and the plurality of second strip electrodes 1112a. In the illustrated embodiment, the plurality of first strip electrodes 1111a are located in a first plane which is parallel to an upper surface of the first substrate 11, and the plurality of second strip electrodes 1112a are located in a second plane which is parallel to the upper surface of the first substrate 11. The second plane is different from the first plane. In other words, the plurality of first strip electrodes 1111a are located in a first layer, and the plurality of second strip electrodes 1112a are located in a second layer which is different from the first layer. In the illustrated embodiment, the first layer and the second layer are insulated by the first insulating layer 1113.

For example, both the plurality of first strip electrodes 1111a and the plurality of second strip electrodes 1112a may be transparent electrodes, and the first insulating layer 1113 may be a transparent insulating layer. The first layer where the plurality of first strip electrodes 1111a are located may be referred to as a first transparent conductive layer 1111, the second layer where the plurality of second strip electrodes 1112a are located may be referred to as a second transparent conductive layer 1112, and a layer where the first insulating layer 1113 is located may also be referred to as a first transparent insulating layer 1113.

As shown in FIG. 2 and FIG. 4, a width of the first strip electrode 1111a in the first direction is named as a first electrode width ew1, a width of a gap between two adjacent first strip electrodes 1111a in the first direction is named as a first width, and a width of a gap between two adjacent second strip electrodes 1112a in the first direction is named as a second width. In the illustrated embodiment, the first width is equal to the second width, and both the first width and the second width are equal to w1.

Figure 5:
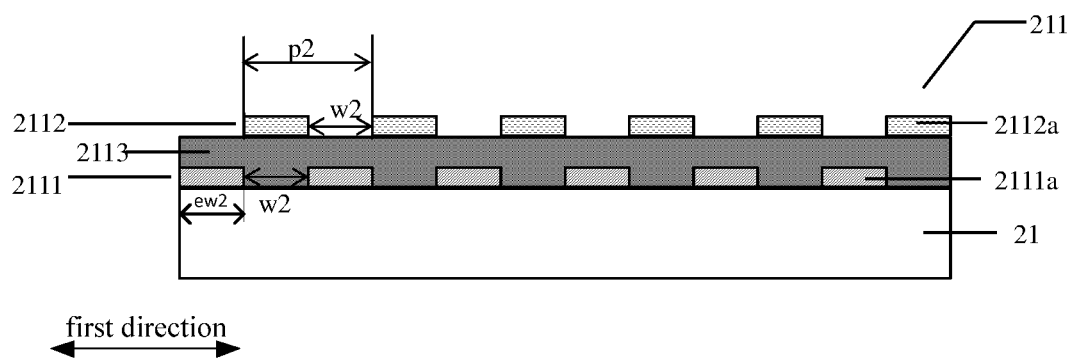
FIG. 5 shows a cross-sectional view of a second electrode structure taken along line B-B in FIG. 3 according to an embodiment of the present disclosure.

FIG. 5 shows a cross-sectional view of the second electrode structure 211 taken along line B-B in FIG. 3 according to an embodiment of the present disclosure. As shown in FIG. 5, the second electrode structure 211 may further include a plurality of third strip electrodes 2111a spaced apart in the first direction (refer to the left-right direction in FIG. 5) on the second substrate 21; a plurality of fourth strip electrodes 2112a spaced apart in the first direction on the second substrate 21; and a second insulating layer 2113 between the plurality of third strip electrodes 2111a and the plurality of fourth strip electrodes 2112a. In the illustrated embodiment, the plurality of third strip electrodes 2111a are located in a third plane which is parallel to an upper surface of the second substrate 21, and the plurality of fourth strip electrodes 2112a are located in a fourth plane which is parallel to the upper surface of the second substrate 21. The fourth plane is different from the third plane. In other words, the plurality of third strip electrodes 2111a are located in a third layer, and the plurality of fourth strip electrodes 2112a are located in a fourth layer which is different from the third layer. In the illustrated embodiment, the third layer and the fourth layer are insulated by the second insulating layer 2113.

For example, both the plurality of third strip electrodes 2111a and the plurality of fourth strip electrodes 2112a may be transparent electrodes, and the second insulating layer 2113 may be a transparent insulating layer. The third layer where the plurality of third strip electrodes 2111a are located may be referred to as a third transparent conductive layer 2111, the fourth layer where the plurality of fourth strip electrodes 2112a are located may be referred to as a fourth transparent conductive layer 2112, and a layer where the second insulating layer 2113 is located may also be referred to as a second transparent insulating layer 2113.

As shown in FIG. 3 and FIG. 5, a width of the third strip electrode 2111a in the first direction is named as a third electrode width ew2, a width of a gap between two adjacent third strip electrodes 2111a in the first direction is named as a third width, and a width of a gap between two adjacent fourth strip electrodes 2112a in the first direction is named as a fourth width. In the illustrated embodiment, the third width is equal to the fourth width, and both the third width and the fourth width are equal to w2.

An operation process of the liquid crystal grating according to the embodiment of the present disclosure will be described with reference to FIG. 1. For convenience of description, the liquid crystal grating is a TN type liquid crystal grating as an example.

When no voltage is applied to the first strip electrodes, the second strip electrodes, the third strip electrodes, and the fourth strip electrodes, that is, when no voltage is applied to liquid crystal molecules in the liquid crystal layer 10, the liquid crystal molecules are arranged in such a way that they are gradually rotated by 90 degrees from top to bottom. In this case, when light passes through the polarizer 16, it becomes linearly polarized light which has a polarization direction consistent with the direction of the transmission axis of the polarizer 16. After the linearly polarized light passes through the liquid crystal molecules, the polarization direction of the linearly polarized light is rotated by 90 degrees due to the optical rotation of the liquid crystal molecules. Since the direction of the transmission axis of the polarizer 15 is perpendicular to the direction of the transmission axis of the polarizer 16, the linearly polarized light whose polarization direction is rotated by 90 degrees may be emitted through the polarizer 15.

Figure 6A:
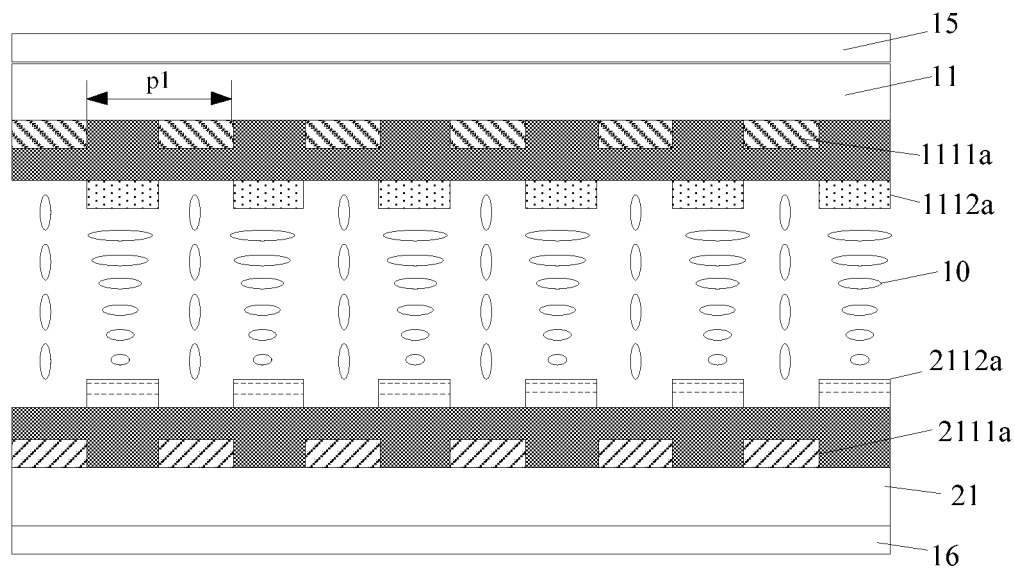
FIG. 6A shows a schematic view of the liquid crystal grating according to an embodiment of the present disclosure under the control of a first set of control signals.
Figure 8:
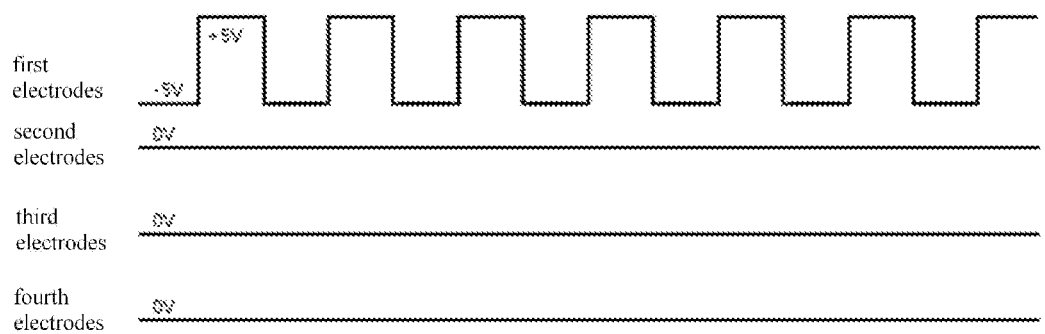
FIG. 8 shows a first set of timing control signals received by a first electrode structure and a second electrode structure according to an embodiment of the present disclosure.
Figure 9:
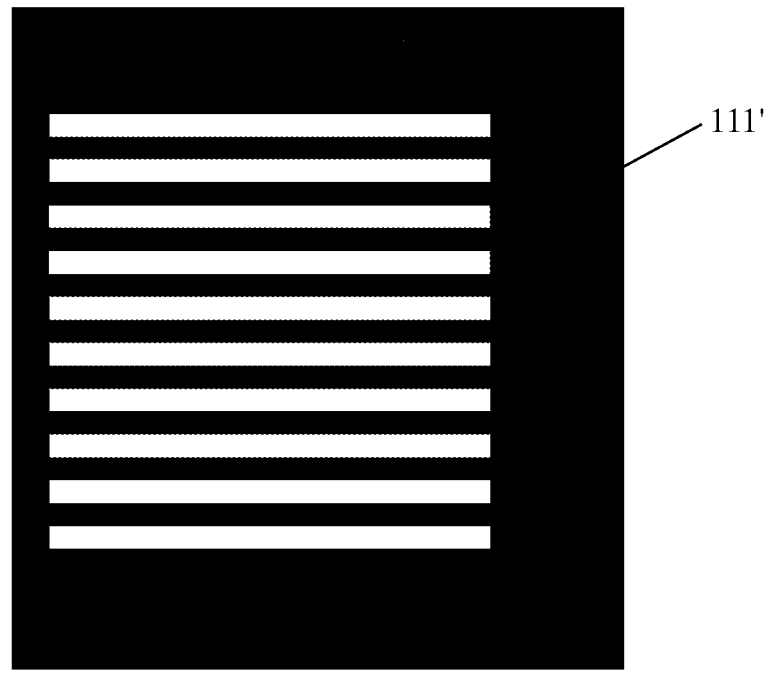
FIG. 9 shows a first grating which is formed in a case that the first electrode structure and the second electrode structure according to an embodiment of the present disclosure receive the first set of timing control signals shown in FIG. 8.

When a first control signal is applied to the first strip electrodes 1111a and a second control signal is applied to the second strip electrodes 1112a, the third strip electrodes 2111a and the fourth strip electrodes 2112a, for example, the first control signal may be a driving voltage signal such as square wave signal, and the second control signal may be a constant voltage direct current (abbreviated as DC) signal, such as DC signal having an amplitude of 0V, referring to FIG. 8. The liquid crystal molecules, which correspond to the first strip electrodes 1111a, in the liquid crystal layer 10 are subjected to an electric field, so that a portion of the liquid crystal molecules in the liquid crystal layer 10 are deflected, as shown in FIG. 6A. In this case, when the linearly polarized light passing through the polarizer 16 passes through the portion of the liquid crystal molecules, the polarization direction of the linearly polarized light is not changed. Since the direction of the transmission axis of the polarizer 15 is perpendicular to the direction of the transmission axis of the polarizer 16, the linearly polarized light may be blocked by the polarizer 15. Therefore, regions where the first strip electrodes 1111a are located will appear dark. The second strip electrodes 1112a, the third strip electrodes 2111a and the fourth strip electrodes 2112a respectively receive the constant voltage DC signal, such as DC signal having amplitude of 0V, so that the liquid crystal molecules, which correspond to the second strip electrodes 1112a, in the liquid crystal layer 10 maintain an initial arrangement state. Therefore, regions where the second strip electrodes 1112a are located will appear bright. In such a case, the liquid crystal grating may form a first grating 111' which has alternating dark stripe regions and bright stripe regions, as shown in FIG. 9.

The dark stripe regions are the regions where the first strip electrodes are located, and the bright stripe regions are the regions where the second strip electrodes are located. In this case, the first grating 111' may have a first grating pitch, and the first grating pitch may be the sum of a width of one dark stripe and a width of one bright stripe shown in FIG. 9. In other words, the first grating pitch p1 is equal to the sum of the first electrode width ew1 (corresponding to the width of the dark stripe) and the first width w1 (corresponding to the width of the bright stripe).

Figure 6B:
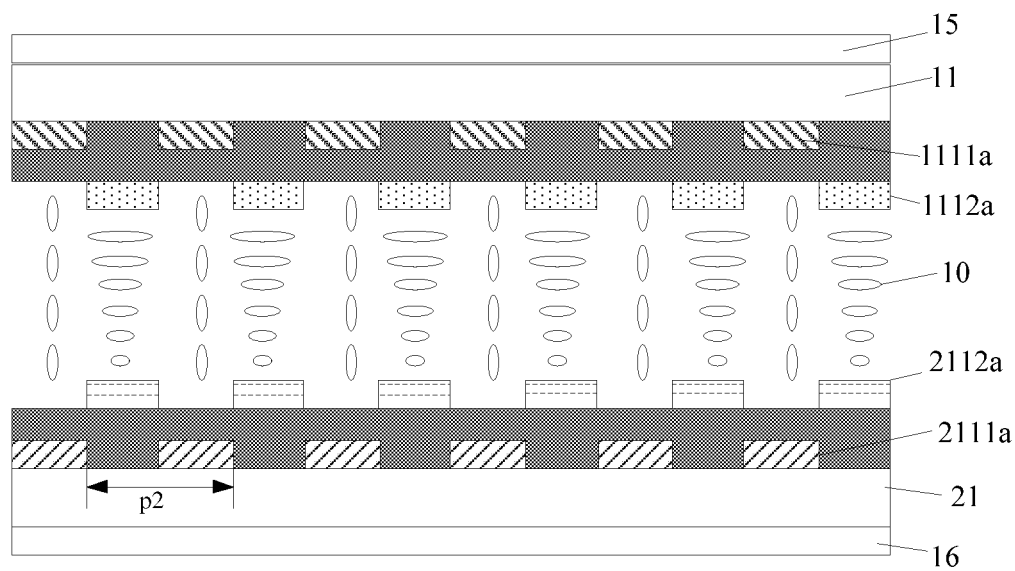
FIG. 6B shows a schematic view of the liquid crystal grating according to an embodiment of the present disclosure under the control of a second set of control signals.
Figure 10:
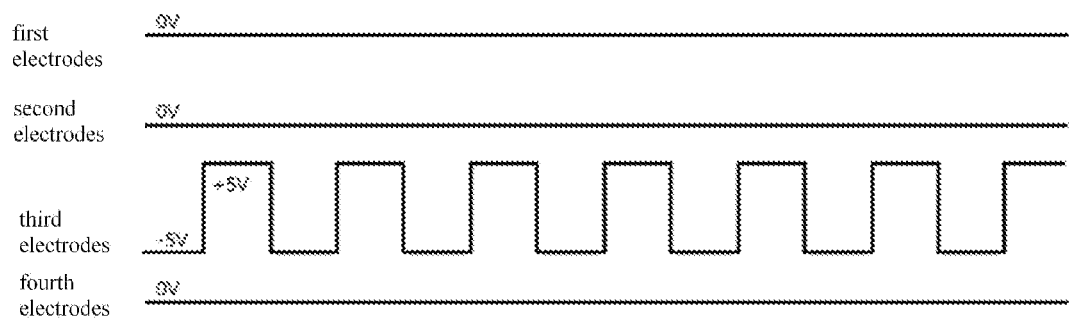
FIG. 10 shows a second set of timing control signals received by the first electrode structure and the second electrode structure according to an embodiment of the present disclosure.
Figure 11:
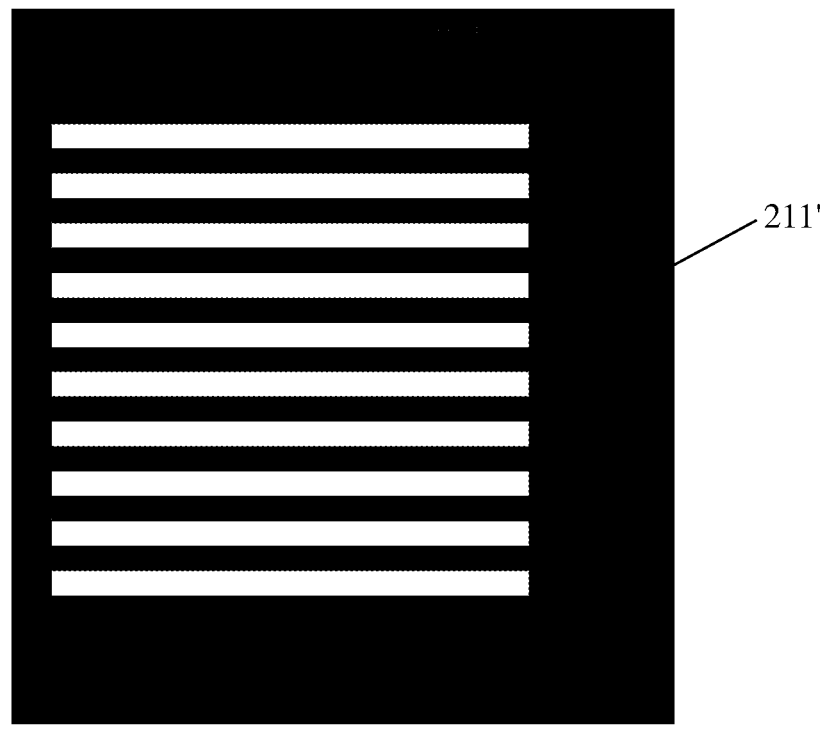
FIG. 11 shows a second grating which is formed in a case that the first electrode structure and the second electrode structure according to an embodiment of the present disclosure receive the second set of timing control signals shown in FIG. 10.

When a first control signal is applied to the third strip electrodes 2111a and a second control signal is applied to the first strip electrodes 1111a, the second strip electrodes 1112a and the fourth strip electrodes 2112a, for example, the first control signal may be a driving voltage signal such as square wave signal, and the second control signal may be a constant voltage DC signal, such as DC signal having an amplitude of 0V, referring to FIG. 10. The liquid crystal molecules, which correspond to the third strip electrodes 2111a, in the liquid crystal layer 10 are subjected to an electric field, so that a portion of the liquid crystal molecules in the liquid crystal layer 10 are deflected, as shown in FIG. 6B. In this case, when the linearly polarized light passing through the polarizer 16 passes through the portion of the liquid crystal molecules, the polarization direction of the linearly polarized light is not changed. Since the direction of the transmission axis of the polarizer 15 is perpendicular to the direction of the transmission axis of the polarizer 16, the linearly polarized light may be blocked by the polarizer 15. Therefore, regions where the third strip electrodes 2111a are located will appear dark. The first strip electrodes 1111a, the second strip electrodes 1112a and the fourth strip electrodes 2112a respectively receive the constant voltage DC signal, such as DC signal having an amplitude of 0V, so that the liquid crystal molecules, which correspond to the fourth strip electrodes 2112a, in the liquid crystal layer 10 maintain an initial arrangement state. Therefore, regions where the fourth strip electrodes 2112a are located will appear bright. In such a case, the liquid crystal grating may form a second grating 211' which has alternating dark stripe regions and bright stripe regions, as shown in FIG. 11. The dark stripe regions are the regions where the third strip electrodes are located, and the bright stripe regions are the regions where the fourth strip electrodes are located. In this case, the second grating 211' may have a second grating pitch, and the second grating pitch may be the sum of a width of one dark stripe and a width of one bright stripe shown in FIG. 11. In other words, the second grating pitch p2 is equal to the sum of the third electrode width ew2 (corresponding to the width of the dark stripe) and the third width w2 (corresponding to the width of the bright stripe). In the embodiments of the present disclosure, the second grating pitch p2 is not equal to the first grating pitch p1.

In the above embodiment, two different electrode structures are respectively disposed on two substrates of the liquid crystal grating, so that one liquid crystal grating may form two gratings with different structures and different grating pitches, thereby improving the integration of the liquid crystal grating. As a result, the problem that only one grating with one grating pitch is provided on two substrates in the related art has been addressed. Moreover, the grating pitches are switchable under the control of signals, that is, two different grating pitches are switchable in the same one liquid crystal grating, so that display effects of two different grating pitches may be obtained in the same one liquid crystal grating, thereby realizing a selectivity of the liquid crystal grating and improving a utilization of liquid crystal grating.

The 3D display effect and the dual view display effect are typically related to the grating pitches. For example, the first grating pitch may correspond to a first 3D display effect, and the second grating pitch may correspond to a second 3D display effect. Therefore, when the 3D display is performed, the liquid crystal grating according to the embodiment of the present disclosure may be switched between the first grating pitch and the second grating pitch, resulting in two switchable 3D display effects. For example, the first grating pitch may correspond to a first dual view display effect, and the second grating pitch may correspond to a second dual view display effect. Therefore, when the dual view display is performed, the liquid crystal grating according to the embodiment of the present disclosure may be switched between the first grating pitch and the second grating pitch, resulting in two switchable dual view display effects. For example, the first grating pitch may correspond to the 3D display effect, and the second grating pitch may correspond to the dual view display effect.

Therefore, when display is performed, the liquid crystal grating according to the embodiment of the present disclosure may be switched between the first grating pitch and the second grating pitch, so that the 3D display and dual view display effects which are switchable are realized.

At different resolutions, the grating pitches required for 3D display or dual view display are different. For example, in the 3D display, the first grating pitch is required at a first resolution and the second grating pitch is required at a second resolution. Therefore, the liquid crystal grating according to the embodiment of the present disclosure may be switched between the first grating pitch and the second grating pitch, thereby achieving switchable 3D display effects at two resolutions. For example, in the dual view display, the first grating pitch is required at a first resolution and a second grating pitch is required at a second resolution. Therefore, the liquid crystal grating according to the embodiment of the present disclosure may be switched between the first grating pitch and the second grating pitch, thereby achieving switchable dual view display effects at two resolutions.

In the illustrated embodiment, referring to FIGS. 2 and 4, orthogonal projections of the plurality of first strip electrodes 1111a on the first substrate 11 are not overlapped with orthogonal projections of the plurality of second strip electrodes 1112a on the first substrate 11. Optionally, an orthogonal projection of each of the plurality of second strip electrodes 1112a on the first substrate 11 coincides with an orthogonal projection of a gap between two adjacent first strip electrodes 1111a on the first substrate 11. In other words, each first strip electrode 1111a corresponds to a gap between two adjacent second strip electrodes 1112a, and each second strip electrode 1112a corresponds to a gap between two adjacent first strip electrodes 1111a. In this embodiment, the first grating pitch p1 may be equal to the sum of the first width and the second width. In the illustrated embodiment, the first width is equal to the second width and equal to w1. In this case, the first grating pitch p1 is twice as large as w1. Optionally, the first width may not be equal to the second width.

Similarly, referring to FIGS. 3 and 5, orthogonal projections of the plurality of third strip electrodes 2111a on the second substrate 21 are not overlapped with orthogonal projections of the plurality of fourth strip electrodes 2112a on the second substrate 21. Optionally, an orthogonal projection of each of the plurality of third strip electrodes 2111a on the second substrate 21 coincides with an orthogonal projection of a gap between two adjacent fourth strip electrodes 2112a on the second substrate 21. In other words, each third strip electrode 2111a corresponds to a gap between two adjacent fourth strip electrodes 2112a, and each fourth strip electrode 2112a corresponds to a gap between two adjacent third strip electrodes 2111a. In this embodiment, the second grating pitch p2 may be equal to the sum of the third width and the fourth width. In the illustrated embodiment, the third width is equal to the fourth width and equal to w2. In this case, the second grating pitch p2 is twice as large as w2. Optionally, the third width may not be equal to the fourth width. With such an arrangement, there is no gap between the orthogonal projection of each of the first strip electrodes on the first substrate and the orthogonal projection of each of the second strip electrodes on the first substrate, and there is no gap between the orthogonal projection of each of the third strip electrodes on the second substrate and the orthogonal projection of each of the fourth strip electrodes on the second substrate, so that all the liquid crystal molecules in the liquid crystal layer 10 may be controlled by the electric field generated between the electrodes and the case that a portion of the liquid crystal molecules are not controlled is absent. As a result, a good display effect of the liquid crystal grating may be ensured.

Referring back to FIG. 2, the first electrode structure 111 may further include: first electrode input lines 112 electrically connected to the plurality of first strip electrodes 1111a; and second electrode input lines 113 electrically connected to the plurality of second strip electrodes 1112a. The first electrode input lines 112 may be located in the first transparent conductive layer 1111. The second electrode input lines 113 may be located in the second transparent conductive layer 1112. The first electrode input lines 112 and the second electrode input lines 113 are configured to receive control signals. That is, the first electrode input lines 112 are located in the same plane as the first strip electrodes 1111a, and the second electrode input lines 113 are located in the same plane as the second strip electrodes 1112a.

Referring back to FIG. 3, the second electrode structure 211 may further include: third electrode input lines 212 electrically connected to the plurality of third strip electrodes 2111a; and fourth electrode input lines 213 electrically connected to the plurality of fourth strip electrodes 2112a. The third electrode input lines 212 may be located in the third transparent conductive layer 2111. The fourth electrode input lines 213 may be located in the fourth transparent conductive layer 2112. The third electrode input lines 212 and the fourth electrode input lines 213 are configured to receive control signals. That is, the third electrode input lines 212 are located in the same plane as the third strip electrodes 2111a, and the fourth electrode input lines 213 are located in the same plane as the fourth strip electrodes 2112a.

With this arrangement, it is convenient to form the strip electrodes and the electrode input lines in the same plane at the same time, so that the process may be simplified.

Figure 7:
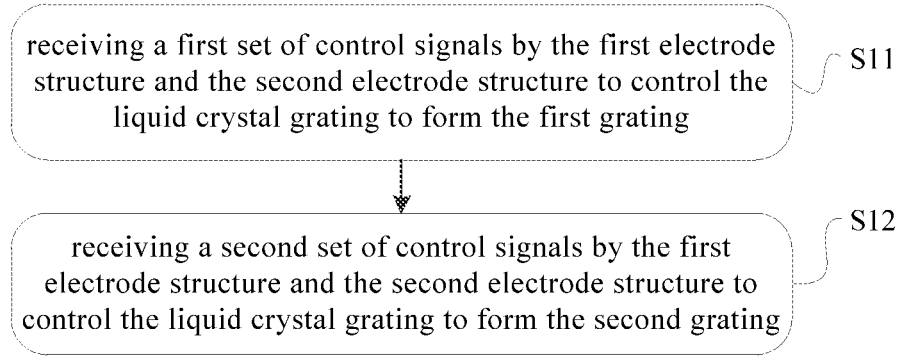
FIG. 7 shows an exemplary flowchart of a control method of a liquid crystal grating according to an embodiment of the present disclosure.

FIG. 7 shows an exemplary flowchart of a control method of a liquid crystal grating according to an embodiment of the present disclosure.

As shown in FIG. 7, the control method of the liquid crystal grating may be used to control the liquid crystal grating according to the embodiments of the present disclosure, and the control method of the liquid crystal grating may include:

step S11: receiving a first set of control signals by the first electrode structure and the second electrode structure to control the liquid crystal grating to form the first grating having the first grating pitch; and step S12: receiving a second set of control signals by the first electrode structure and the second electrode structure to control the liquid crystal grating to form the second grating with the second grating pitch.

In the above embodiment, the control signals may be timing control signals. The first set of timing control signals may include four timing control signals independent of each other. The first electrode input lines on the first substrate, the second electrode input lines on the first substrate, the third electrode input lines on the second substrate, and the fourth electrode input lines on the second substrate may be configured to respectively receive the four timing control signals to control the liquid crystal grating to form the first grating. Similarly, the second set of timing control signals may include four timing control signals independent of each other. The first electrode input lines on the first substrate, the second electrode input lines on the first substrate, the third electrode input lines on the second substrate, and the fourth electrode input lines on the second substrate may be configured to respectively receive the four timing control signals to control the liquid crystal grating to form the second grating.

In the embodiment, two different sets of timing control signals are used to control the first electrode structure and the second electrode structure of the liquid crystal grating so that two gratings with different structures are formed. In other words, the two gratings with different structures may be switched by means of switching the two sets of timing control signals, thereby realizing a selectivity of the liquid crystal grating and improving a utilization of liquid crystal grating.

Since the 3D display effect and the dual view display effect are typically related to the grating pitch, the 3D display effects of two gratings may be obtained with the liquid crystal grating in the 3D display, so that two switchable 3D display effects are obtained. Similarly, in the dual view display, the dual view display effects of two gratings may be obtained with the liquid crystal grating, so that two switchable dual view display effects are obtained. When both the 3D display and the dual view display are performed, the 3D display of the first grating and the dual view display of the second grating may be obtained with the liquid crystal grating, so that display effect which is switched between the 3D display and the dual view display may be obtained. Moreover, due to different resolutions of a display panel, gratings with different grating structures need to be designed. Therefore, when the liquid crystal grating is applied to the display panel, two resolutions may be compatible, that is, a display effect which is switched between 3D display effects at two resolutions may be obtained, or a display effect which is switched between dual view display effects at two resolutions may be obtained.

Further, the step S11 may include:

step S111: receiving a first timing control signal by the first electrode input lines and receiving a second timing control signal by the second electrode input lines, the third electrode input lines and the fourth electrode input lines to control the liquid crystal grating to form the first grating.

In the embodiment, the first electrode input lines receive a timing control signal different from that received by the second electrode input lines, the third electrode input lines, or the fourth electrode input lines, to form the first grating. The first timing control signal may be a driving voltage signal such as square wave signal, or other signals capable of driving the first strip electrodes to appear dark. The second timing control signal may be a constant voltage DC signal, or other signals capable of driving the second strip electrodes to appear bright.

Further, the step S12 may include:

step S121: receiving the first timing control signal by the third electrode input lines and receiving the second timing control signal by the first electrode input lines, the second electrode input lines and the fourth electrode input lines to control the liquid crystal grating to form the second grating.

In the embodiment, the third electrode input lines receive a timing control signal different from that received by the first electrode input lines, the second electrode input lines or the fourth electrode input lines, to form the second grating. The first timing control signal may be a square wave signal, or other signals capable of driving the third strip electrodes to appear dark. The second timing control signal may be a constant voltage DC signal, or other signals capable of driving the fourth strip electrodes to appear bright.

Optionally, the first timing control signal may be a square wave signal.

Optionally, the second timing control signal may be a constant voltage DC signal, such as a DC signal with an amplitude of 0V.

Further, in the step S111, the first electrode input lines receive the driving voltage signal, such as square wave signal, and the second electrode input lines, the third electrode input lines, and the fourth electrode input lines respectively receive the second timing control signal, to drive regions where the first strip electrodes are located to appear dark and to drive regions where the second strip electrodes are located to appear bright. As a result, the first grating with the first grating pitch is formed.

Specifically, FIG. 9 shows the first grating 111' which is formed in a case that the first electrode structure and the second electrode structure according to the embodiment of the present disclosure receive the first set of timing control signals shown in FIG. 8. As shown in FIG. 8, the first set of timing control signals may include: a driving voltage signal, which is a high voltage signal of 60 Hz frequency and 5V amplitude, received by the first electrode input lines; and common voltage signals received respectively by the second electrode input lines, the third electrode input lines, and the fourth electrode input lines, each of the common voltage signals being a DC signal of 0V amplitude. According to the TN display mode, after the first electrode input lines receive the driving voltage signal, the liquid crystal molecules are changed from the initial arrangement state to an untwisted state, so that the polarization direction of light is not changed, and thus light passing through the regions where the first strip electrodes are located will be blocked by the polarizer. As a result, a light-proof state (i.e. dark state) is presented. After the second electrode input lines, the third electrode input lines and the fourth electrode input lines respectively receive the common voltage DC signal of 0V amplitude, the liquid crystal molecules maintain the initial twisted state, so that light passing through the regions where the second strip electrodes are located will be emitted due to the twisted state. As a result, a light-transmitting state (i.e. bright state) is presented. Therefore, under the control of the first set of timing control signals shown in FIG. 8, the liquid crystal grating may form the first grating 111' which has alternating dark stripe regions and bright stripe regions, as shown in FIG. 9. The dark stripe regions are the regions where the first strip electrodes are located, and the bright stripe regions are the regions where the second strip electrodes are located. The first grating 111' may have the first grating pitch. The first grating pitch may be the sum of a width of one dark stripe and a width of one bright stripe as shown in FIG. 9. The first grating 111' may be selected to be used as a grating for 3D display or dual view display, or be used as a grating for other types of display.

Further, in the step S121, the third electrode input lines receive the driving voltage signal, such as square wave signal, and the first electrode input lines, the second electrode input lines and the fourth electrode input lines respectively receive the second timing control signal, to drive the third strip electrodes to appear dark and to drive the fourth strip electrodes to appear bright. As a result, the second grating with the second grating pitch is formed.

Specifically, FIG. 11 shows the second grating 211' which is formed in a case that the first electrode structure and the second electrode structure according to the embodiment of the present disclosure receive the second set of timing control signals shown in FIG. 10. As shown in FIG. 10, the second set of timing control signals may include: a driving voltage signal, which is a high voltage signal of 60 Hz frequency and 5V amplitude, received by the third electrode input lines; and common voltage signals received respectively by the first electrode input lines, the second electrode input lines and the fourth electrode input lines, each of the common voltage signals being a DC signal of 0V amplitude. According to the TN display mode, after the third electrode input lines receive the driving voltage signal, the liquid crystal molecules are changed from the initial arrangement state to an untwisted state, so that the polarization direction of light is not changed, and thus light passing through the regions where the third strip electrodes are located will be blocked by the polarizer. As a result, a light-proof state (i.e. dark state) is presented. After the first electrode input lines, the second electrode input lines and the fourth electrode input lines respectively receive the common voltage DC signal of 0V amplitude, the liquid crystal molecules maintain the initial twisted state, so that light passing through regions where the fourth strip electrodes are located will be emitted due to the twisted state. As a result, a light-transmitting state (i.e. bright state) is presented. Therefore, under the control of the second set of timing control signals shown in FIG. 10, the liquid crystal grating may form the second grating 211' which has alternating dark stripe regions and bright stripe regions, as shown in FIG. 11. The dark stripe regions are the regions where the third strip electrodes are located, and the bright stripe regions are the regions where the fourth strip electrodes are located. The second grating 211' may have the second grating pitch. The second grating pitch may be the sum of a width of one dark stripe and a width of one bright stripe as shown in FIG. 11. The second grating 211' may be selected to be used as a grating for 3D display or dual view display, or be used as a grating for other types of display.

In the embodiment, the first electrode structure and the second electrode structure of the liquid crystal grating are controlled by using two different sets of timing control signals to form two gratings with different structures. In other words, the two gratings with different structures may be switched by means of switch between two sets of timing signals, so that two different grating pitches may be switched, thereby realizing the selectivity of the liquid crystal grating and improving the utilization of the liquid crystal grating.

Since the 3D display effect and the dual view display effect are typically related to the grating pitch, the 3D display effects of two gratings may be obtained with the liquid crystal grating in the 3D display, so that two switchable 3D display effects are obtained. Similarly, in the dual view display, the dual view display effects of two gratings may be obtained with the liquid crystal grating, so that two switchable dual view display effects are obtained. When both the 3D display and the dual view display are performed, the 3D display of the first grating and the dual view display of the second grating may be obtained with the liquid crystal grating, so that display effect which is switched between the 3D display and the dual view display may be obtained. Moreover, due to different resolutions of a display panel, gratings of different grating structures need to be designed. Therefore, when the liquid crystal grating is applied to the display panel, two resolutions may be compatible, that is, a display effect which is switched between 3D display effects at two resolutions may be obtained, or a display effect which is switched between dual view display effects at two resolutions may be obtained.

An embodiment of the present disclosure also provides a display device including the above-mentioned liquid crystal grating.

Further, the display device may be a 3D display device and/or a dual view display device.

The above descriptions are merely preferred embodiments of the present disclosure and descriptions of used technical principles. Those skilled in the art should understand that the scope of the invention referred to in the present disclosure is not limited to the technical solutions specifically combined by the above technical features, but also should cover the technical solutions which are formed by combining technical features described above and other equivalent features without departing from the inventive concept, for example, the technical solutions which are formed by replacing the technical features described above with technical features that have similar functions as the disclosed (but not limited) technical features.

What is claimed is:

1. A liquid crystal grating comprising:
   a first substrate;
   a second substrate opposite to the first substrate;
   a liquid crystal layer between the first substrate and the second substrate;
   a first electrode structure on the first substrate, the first electrode structure comprising a plurality of first strip electrodes spaced apart in a first direction on the first substrate and a plurality of second strip electrodes spaced apart in the first direction on the first substrate; and
   a second electrode structure on the second substrate, the second electrode structure comprising a plurality of third strip electrodes spaced apart in the first direction on the second substrate and a plurality of fourth strip electrodes spaced apart in the first direction on the second substrate, wherein the first electrode structure and the second electrode structure are configured:

to receive control signals, the control signals comprising a first set of control signals and a second set of control signals, the second set of control signals comprising a first timing control signal supplied to the plurality of third strip electrodes, and a second timing control signal supplied to the plurality of first strip electrodes, the plurality of second strip electrodes and the plurality of fourth strip electrodes, respectively, and the first set of control signals comprising the first timing control signal supplied to the plurality of first strip electrodes, and the second timing control signal supplied to the plurality of second strip electrodes, the plurality of third strip electrodes and the plurality of fourth strip electrodes, respectively;

to cause the liquid crystal grating to have a first grating pitch in response to the first set of control signals; and to cause the liquid crystal grating to have a second grating pitch in response to the second set of control signals, the second grating pitch being different from the first grating pitch.

2. The liquid crystal grating according to claim 1, wherein the first electrode structure comprises:

a first insulating layer between the plurality of first strip electrodes and the plurality of second strip electrodes, wherein the plurality of first strip electrodes are located in a first plane, the plurality of second strip electrodes are located in a second plane different from the first plane, and orthogonal projections of the plurality of first strip electrodes on the first substrate are not overlapped with orthogonal projections of the plurality of second strip electrodes on the first substrate.

3. The liquid crystal grating according to claim 2, wherein a width of each of the plurality of first strip electrodes in the first direction is a first electrode width, a width of a gap between two adjacent first strip electrodes in the first direction is a first width, and the first grating pitch is equal to the sum of the first electrode width and the first width.

4. The liquid crystal grating according to claim 2, wherein an orthogonal projection of each of the plurality of second strip electrodes on the first substrate coincides with an orthogonal projection of a gap between two adjacent first strip electrodes on the first substrate, and wherein a width of the gap between the two adjacent first strip electrodes in the first direction is a first width, a width of a gap between two adjacent second strip electrodes in the first direction is a second width, and the first grating pitch is equal to the sum of the first width and the second width.

5. The liquid crystal grating according to claim 4, wherein the first width is equal to the second width.

6. The liquid crystal grating according to claim 2, wherein the first electrode structure further comprises:

first electrode input lines electrically connected to the plurality of first strip electrodes, the first electrode input lines being located in the first plane; and second electrode input lines electrically connected to the plurality of second strip electrodes, the second electrode input line being located in the second plane, wherein the first electrode input lines and the second electrode input lines are configured to receive the control signals.

7. The liquid crystal grating according to claim 1, wherein the second electrode structure comprises:

a second insulating layer between the plurality of third strip electrodes and the plurality of fourth strip electrodes, wherein the plurality of third strip electrodes are located in a third plane, the plurality of fourth strip electrodes are located in a fourth plane different from the third plane, and orthogonal projections of the plurality of third strip electrodes on the second substrate are not overlapped with orthogonal projections of the plurality of fourth strip electrodes on the second substrate.

8. The liquid crystal grating according to claim 7, wherein a width of each of the plurality of third strip electrodes in the first direction is a third electrode width, a width of a gap between two adjacent third strip electrodes in the first direction is a third width, and the second grating pitch is equal to the sum of the third electrode width and the third width.

9. The liquid crystal grating according to claim 7, wherein an orthogonal projection of each of the plurality of fourth strip electrodes on the second substrate coincides with an orthogonal projection of a gap between two adjacent third strip electrodes on the second substrate, and wherein a width of the gap between the two adjacent third strip electrodes in the first direction is a third width, a width of a gap between two adjacent fourth strip electrodes in the first direction is a fourth width, and the second grating pitch is equal to the sum of the third width and the fourth width.

10. The liquid crystal grating of claim 9, wherein the third width is equal to the fourth width.

11. The liquid crystal grating according to claim 7, wherein the second electrode structure further comprises:

third electrode input lines electrically connected to the plurality of third strip electrodes, the third electrode input lines being located in the third plane; and fourth electrode input lines electrically connected to the plurality of fourth strip electrodes, the fourth electrode input line being located in the fourth plane, wherein the third electrode input lines and the fourth electrode input lines are configured to receive the control signals.

12. A display device, wherein the display device comprises the liquid crystal grating according to claim 1.

13. The display device according to claim 12, wherein the display device is a 3D display device and/or a dual view display device.

14. A control method of a liquid crystal grating, wherein the liquid crystal grating comprises: a first substrate; a second substrate opposite to the first substrate; a liquid crystal layer between the first substrate and the second substrate; a first electrode structure on the first substrate; and a second electrode structure on the second substrate, and the method comprises:

receiving a first set of control signals by the first electrode structure and the second electrode structure to control the liquid crystal grating to have a first grating pitch; and receiving a second set of control signals by the first electrode structure and the second electrode structure to control the liquid crystal grating to have a second grating pitch different from the first grating pitch, wherein the first electrode structure comprises a plurality of first strip electrodes spaced apart in a first direction on the first substrate and a plurality of second strip electrodes spaced apart in the first direction on the first substrate, and the second electrode structure comprises a plurality of third strip electrodes spaced apart in the first direction on the second substrate and a plurality of fourth strip electrodes spaced apart in the first direction on the second substrate, wherein the receiving a second set of control signals by the first electrode structure and the second electrode structure to control the liquid crystal grating to have a second grating pitch different from the first grating pitch comprises:

receiving a first timing control signal by the plurality of third strip electrodes, and receiving a second timing control signal by the plurality of first strip electrodes, the plurality of second strip electrodes and the plurality of fourth strip electrodes, to control the liquid crystal grating to have the second grating pitch, and wherein the receiving, a first set of control signals by the first electrode structure and the second electrode structure to control the liquid crystal grating to have a first grating pitch comprises:

receiving the first timing control signal by the plurality of first strip electrodes, and receiving the second timing control signal by the plurality of second strip electrodes, the plurality of third strip electrodes and the plurality of fourth strip electrodes, to control the liquid crystal grating to have the first grating pitch.

15. The control method according to claim 14, wherein the first timing control signal is a square wave signal.

16. The control method according to claim 14, wherein the second timing control signal is a constant voltage DC signal.

17. The control method according to claim 14, wherein the receiving the first timing control signal by the plurality of first strip electrodes, and receiving the second timing control by the plurality of second strip electrodes, the plurality of third strip electrodes and the plurality of fourth strip electrodes, to control the liquid crystal grating to have the first grating pitch comprises:

receiving the first timing control signal by the plurality of first strip electrodes, and receiving the second timing control by the plurality of second strip electrodes, the plurality of third strip electrodes and the plurality of fourth strip electrodes, to control regions where the plurality of first strip electrodes are located to appear dark and control regions where the plurality of second strip electrodes are located to appear bright, so as to form a first liquid crystal grating having the first grating pitch.

18. The control method according to claim 14, wherein the receiving the first timing control signal by the plurality of third strip electrodes, and receiving the second timing control by the plurality of first strip electrodes, the plurality of second strip electrodes and the plurality of fourth strip electrodes, to control the liquid crystal grating to have the second grating pitch comprises:

receiving the first timing control signal by the plurality of third strip electrodes, and receiving the second timing control by the plurality of first strip electrodes, the plurality of second strip electrodes and the plurality of fourth strip electrodes, to control regions where the plurality of third strip electrodes are located to appear dark and control regions where the plurality of fourth strip electrodes are located to appear bright, so as to form a second liquid crystal grating having the second grating pitch.

* * * * *